United States Patent [19]
Bergquist et al.

[11] 3,795,115
[45] Mar. 5, 1974

[54] METHOD AND APPARATUS FOR JOINING SUBSEA PIPELINES

[75] Inventors: Arthur John Bergquist, Houston, Tex.; Roy E. Blaby, New Westminster, British Columbia; John W. Hopkins, North Burnaby, British Columbia, both of Canada

[73] Assignee: Lockheed Petroleum Services, Ltd., New Westminster, British Columbia, Canada

[22] Filed: Sept. 5, 1972

[21] Appl. No.: 286,597

[52] U.S. Cl............ 61/72.3, 61/69, 166/.6, 285/18
[51] Int. Cl............ F16l 1/00, F16l 31/00
[58] Field of Search........ 61/72.1, 72.3, 69; 285/18; 166/.6; 29/429

[56] References Cited
UNITED STATES PATENTS

| | | | |
|---|---|---|---|
| 3,525,226 | 8/1970 | McCarron | 61/72.3 |
| 3,641,777 | 2/1972 | Banjavich et al. | 61/72.3 |
| 3,732,923 | 5/1973 | Fowler | 166/.6 |

*Primary Examiner*—Jacob Shapiro
*Attorney, Agent, or Firm*—George C. Sullivan; Keiichiro Imai

[57] ABSTRACT

A method and apparatus for underwater laying and joining of pipeline segments, especially where such segments lie at depths of several hundred feet. The individual segments consist of a pipestring permanently attached to a joint chamber at one end. When submerged, the joint chamber is kept at atmospheric pressure and is utilized by personnel operating within it to bring a segment on the surface into proximity with the submerged segment and to join the two segments. A manned atmospheric pressure capsule operating from a surface vessel is used to reach the submerged chamber and to support the various operations conducted in the chamber.

11 Claims, 7 Drawing Figures

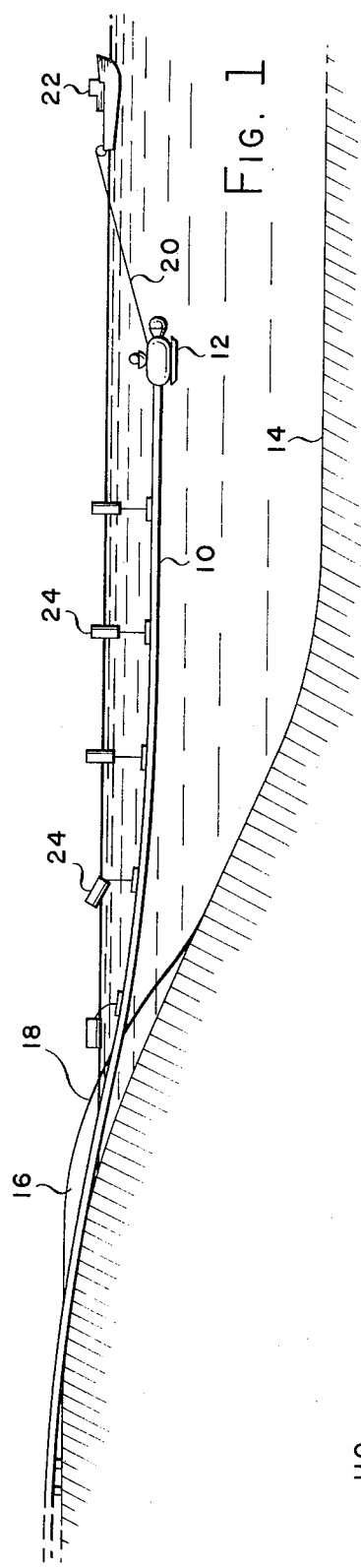
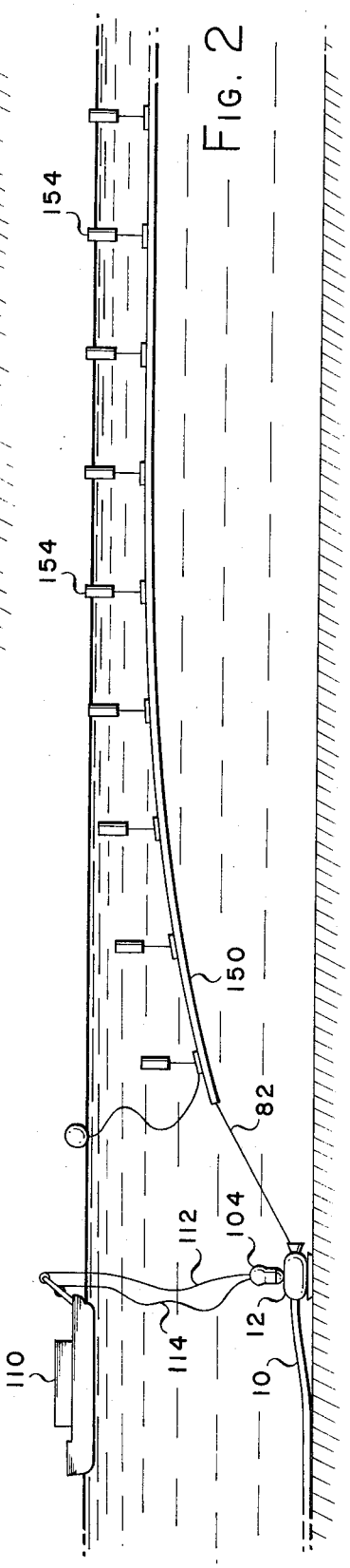
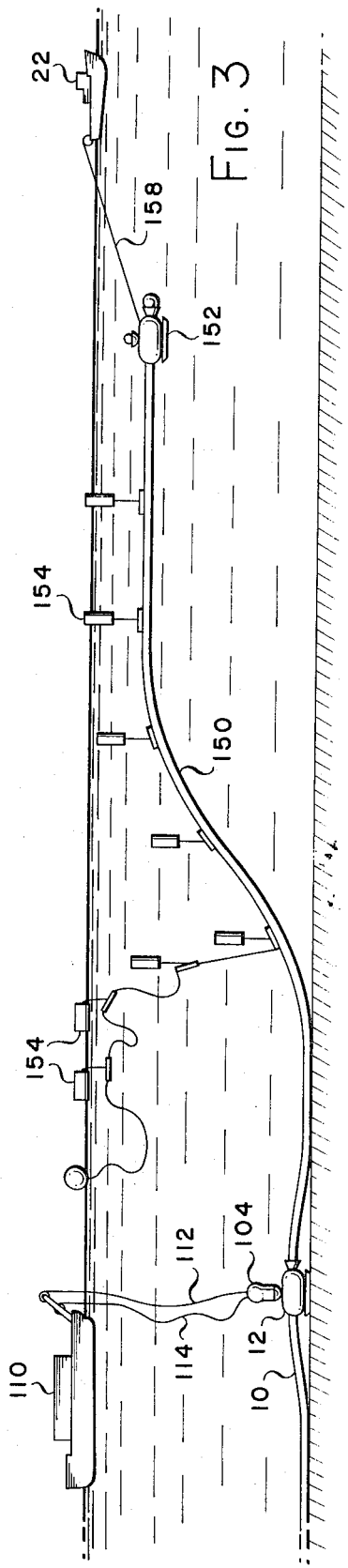

3,795,115

METHOD AND APPARATUS FOR JOINING SUBSEA PIPELINES

BACKGROUND OF THE INVENTION

1. Field of the Invention

This invention relates to a method and apparatus for underwater laying and joining of pipeline segments, especially in offshore petroleum recovery operations. It may be used, for example, to join subsea petroleum wells to a platform or to an onshore production facility for the separation of fluids. It is particularly useful where the segments lie at depths of several hundred feet where the usual operations of divers are severely restricted.

2. Description of the Prior Art

Several methods have been proposed in the past for the underwater joining of pipelines with the aid of divers. One method utilizes a work chamber which is lowered from a surface vessel and placed near the aligned ends of the pipelines to be joined. The chamber has an open bottom so that it can be entered by divers after the chamber has been pressurized to displace the water. The divers then proceed to bring the ends of the pipes into the chamber where they can be welded together.

Another method also utilizes an underwater work chamber in the joining of an underwater pipeline to a riser conduit which is, in turn, attached to an offshore platform supported on the seabed. In this method, a draw line running through the conduit is attached at one end to a deck engine on the platform and at the other end to a snubbed bull plug on the pipeline. The pipeline is initially carried on a barge and is partially supported by a pipelaying pontoon attached to the barge while the pipeline is being pulled down to mate with the conduit. The mating is facilitated by a funnel on the end of the conduit. After the pipeline is inserted into the funnel, a work chamber having an open bottom is lowered from a surface vessel and placed over the ends of the conduit and pipeline. The ends are then sealed in the chamber and the latter is pressurized to displace the water. Divers subsequently enter the chamber and join the conduit and pipeline by cutting off the funnel and welding a connecting pipe section between the pipe and conduit.

As is well known, the effectiveness of divers becomes limited at depths beyond about 350 feet. At these depths, the pressures become excessive and the usual decompression techniques for divers become time-consuming and costly. Accordingly, the two methods previously described are also limited in their usefulness at these depths.

For the greater depths, the use of a robot welding unit controlled by a surface vessel has been proposed for the joining of pipelines. The pipe sections to be joined are supplied to the welding unit by an unmanned, remotely controlled, submersible vehicle having articulated manipulators for handling the pipe sections. By the nature of the equipment employed, it is apparent that this method would be quite complicated and expensive.

SUMMARY OF THE INVENTION

It is an object of the present invention to provide a method and apparatus for underwater laying and joining of pipestrings at depths where diver operations are severely limited.

It is also an object of the present invention to provide a method and apparatus wherein working conditions closely approximate those found on the surface so that special techniques, tools and equipment need not be devised for underwater operations.

According to the present invention, a plurality of pipe segments is provided, each segment consisting of a pipestring permanently attached at one end to a work or joint chamber. The pipestring is comprised of many pipe sections welded together and may be several hundred feet in length. The joint chamber is a pressure vessel and is provided with a central access hatch at the top and a sealed port diametrically opposite the pipestring opening. The port initially contains a tethered buoy which can be released and retrieved at the surface. The cable attached to the buoy is stretched across the chamber and attached at the other end to a piston device carried in the pipestring. The pipestring opening is closed off with a packer assembly and a blind flange and the port is closed off with a pressure cap and a ball valve. Intermediate these closures is a pipe assembly which carries the cable connecting the buoy to the piston device.

After the first pipe segment is lowered to the seabed, a manned atmospheric pressure capsule operating from a surface ship is used to descent to the work chamber and join with the chamber at the access hatch. The capsule is supplied with air, hydraulic fluid, electrical and communication lines through an umbilical cord connected to the ship and the capsule in turn furnishes these utilities to the joint chamber.

When the capsule and chamber are joined, workmen in the capsule descend into the chamber, which is maintained at atmospheric pressure, and release the buoy contained in the port. The buoy is recovered at the surface and the cable attached to the buoy is connected to a pull-in plug on a second pipestring on the surface. On signal from the surface, workmen in the chamber begin to pull down the second pipestring by admitting ambient seawater into the first pipestring, forcing the piston device therein to move outwardly in the pipestring. Additional pressure on the piston device may also be supplied by pumps located in the capsule.

After the tethered end of the second pipestring has been pulled into the port and sealed therein, the seawater pressure in the lines is relieved. The blind flange on the pipestring opening, the closure devices on the port, and the connecting pipe assembly are then removed, exposing a short section of the two pipestrings in the chamber. The cable and the pull-in plug are then taken off the second pipestring, and a section of pipe carried in the joint chamber is lifted in place between the exposed ends of the two pipestrings and welded to the pipestrings. The piston device, packer assembly and cable are later flushed down the pipeline to a shore facility.

After the pipestrings are joined, the workmen return to the utility capsule bringing with them welding and other equipment and then ascend to the surface ship. The joint chamber is left on the seabed as a permanent part of the pipeline and can be relocated with the aid of a buoy. It can be reached with a utility capsule and re-entered if the pipeline should need servicing or repair.

The third and subsequent pipe segments are laid and joined in the manner above described by utilizing the utility capsule to reach and enter the respective joint chambers where the joining of the segments takes place.

It will be noted that the use of the present joint chamber eliminates the need for divers and consequently permits the laying of subsea pipelines at almost any depth. The chamber also permits the use of the usual tools and techniques used on the surface. Welding operations, for example, can utilize conventional equipment and the completed welds can also be inspected by conventional equipment and techniques.

Other features and advantages of the present invention will become more apparent from the following detailed description of typical forms and applications of the invention taken in conjunction with the accompanying drawings.

BRIEF DESCRIPTION OF THE DRAWINGS

FIG. 1 is a schematic illustration showing the first pipeline segment being laid on the seabed, starting at a shore installation (not shown);

FIG. 2 is another schematic illustration, showing an utility capsule mated to the joint chamber of the first pipestring and a second pipestring being pulled down to the joint chamber;

FIG. 3 is also a schematic illustration, showing the second pipestring being laid on the seabed after jointure with the joint chamber;

DESCRIPTION OF THE PREFERRED EMBODIMENT

Figure 4:
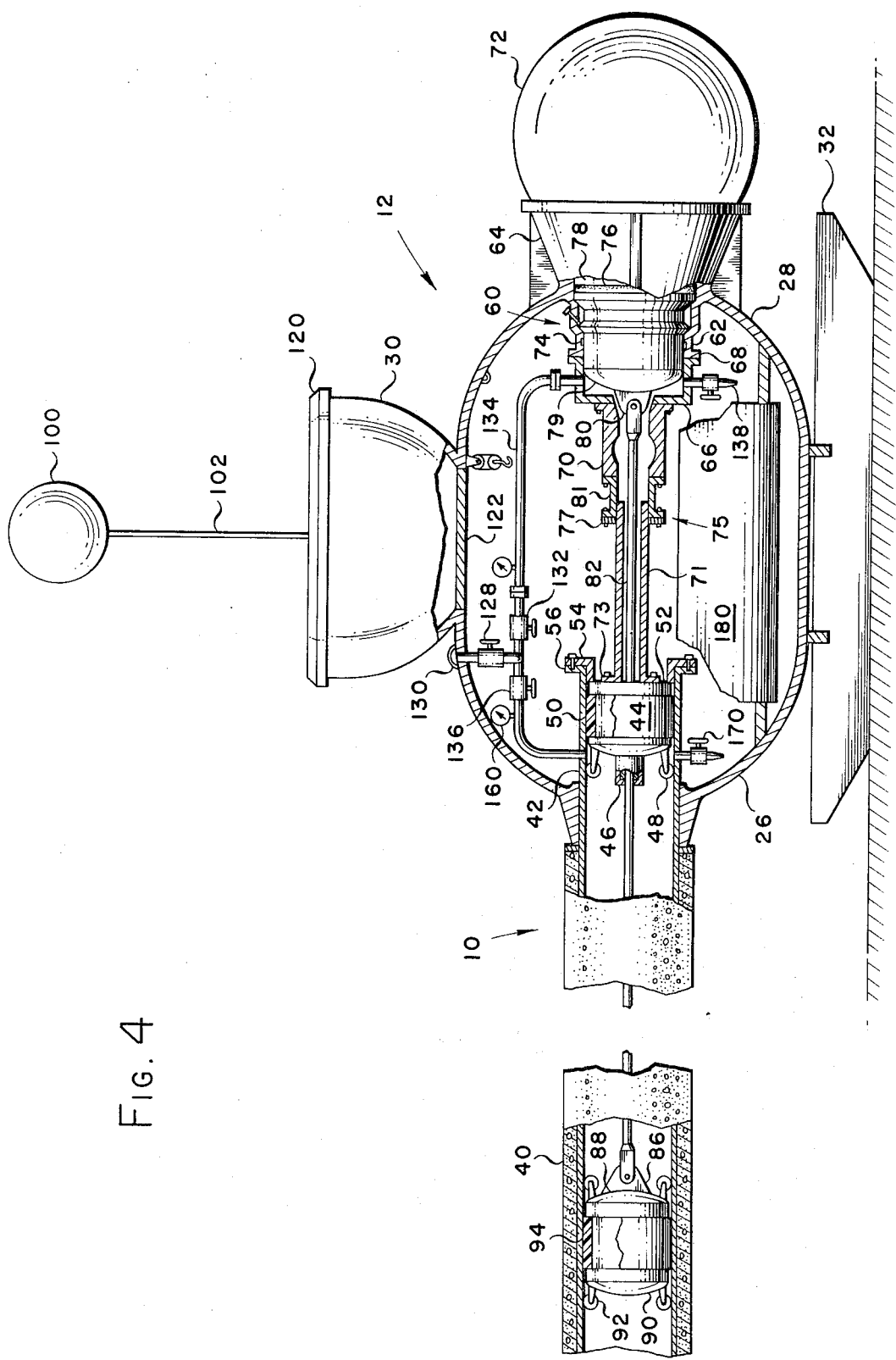
FIG. 4 is a side elevational view, partly in section, showing the first pipestring and its accompanying joint chamber shortly after the chamber has come to rest on the seabed.

FIG. 1 shows a pipestring 10, constituting the first segment of the pipeline, and its accompanying joint chamber 12 being laid on the seabed 14. A portion of the pipestring 10 is laid in a trench 16 through the wave surf zone on shore 18. The shore end of pipestring 10 is connected to a shore installation (not shown). The pipestring is maintained under tension at all times by means of a cable 20 stretched between chamber 12 and a work boat 22. Pipestring 10 is further supported by a series of buoys 24. These buoys are sequentially deflated or released so that the adjoining section of the pipeline will lose its buoyancy and gradually sink to the seabed 14. Tension is maintained on pipeline 10 until chamber 12 rests on the seabed.

As shown more clearly in FIG. 4, chamber 12 is a cylindrical pressure vessel having hemispherical ends 26, 28, an overhead access hatch 30 and a skid support 32. Pipestring 10 having a concrete exterior 40 negative buoyancy is attached, as by welding, to end 26. A short, uncovered extension 42 of the pipestring protrudes into the chamber. Extension 42 is closed off with a packer assembly 44, said assembly comprising a central packing gland 46, runner wheels 48, annular sealing element 50, and a centrally perforated end wall 52. Packer assembly 44 is detained in extension 42 by a blind flange member 54 which is appropriately bolted to an end flange 56 on extension 42.

Figure 5:
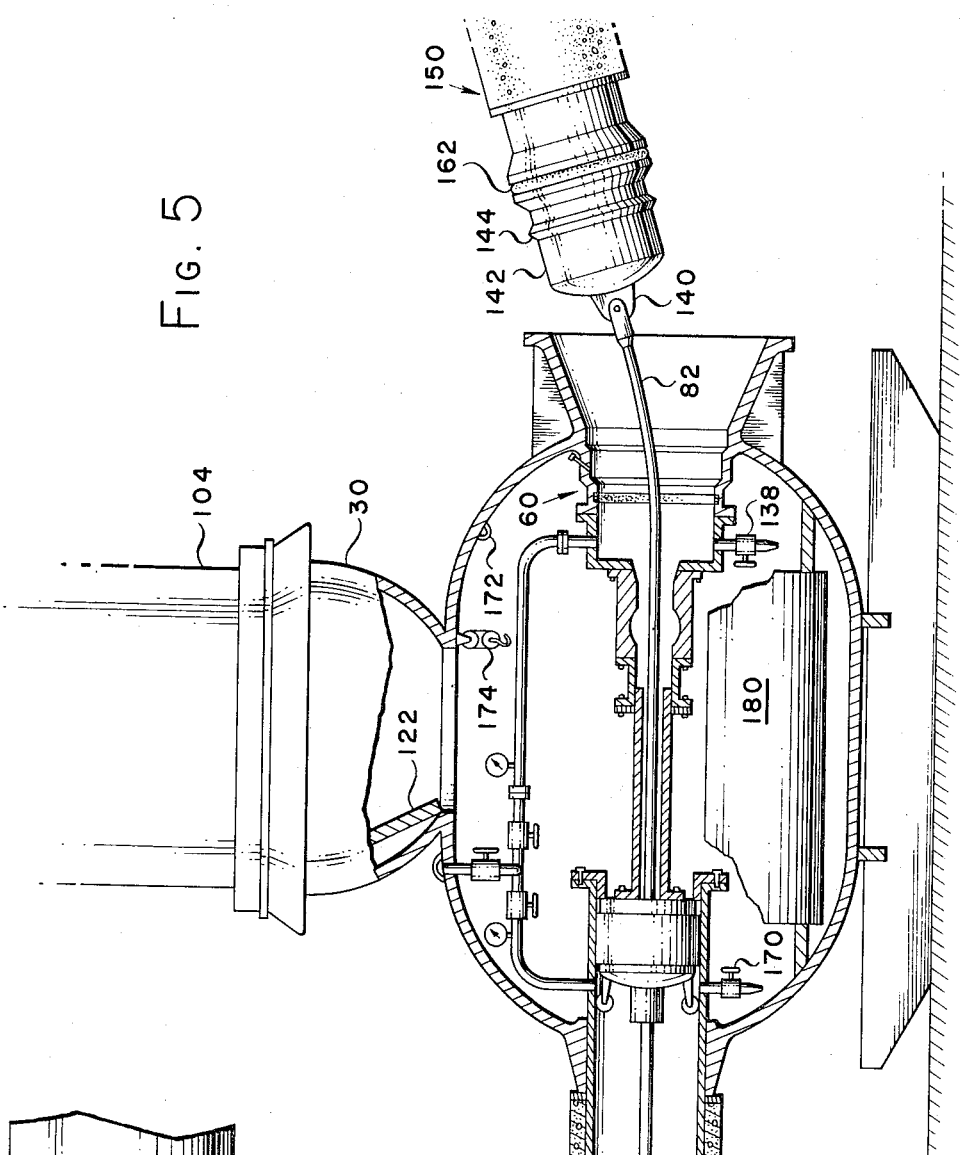
FIG. 5 is a side elevational view, partly in section, showing the first pipestring and joint chamber with a portion of the utility capsule mated to the chamber and a second pipestring being pulled into proximity with the chamber.

As shown in FIGS. 4 and 5, directly opposite extension 42 and mounted in end 28 is a port assembly 60, which comprises an internal substantially cylindrical portion 62 and a flared external portion 64. Portion 62 is closed off with a pressure cap 66 bolted to an end flange 68 on port portion 62 and with a ball valve 70 made integral with cap 66. An interconnecting pipe section 71 is attached by a flanged connection 73 to end wall 52 of packer assembly 44 and to valve 70 by a movable connection 75 adapted to slide over section 71. Connection 75 comprises a movable collar 77 attached to a flanged member 81 which in form is attached to valve 70.

A bulbous buoy 72 is contained in port assembly 60, said buoy being adapted to fit into the flared and cylindrical portions 64, 62. A portion of the buoy lies outside of the port assembly. The buoy is sealed with a hydraulically actuated packer seal 74 in port portion 62 and a compressible seal comprising an elastomeric ring 76 and a metal bearing ring 78 on the buoy neck.

An end cap 79 on the buoy carries a lug 80 to which is attached a cable 82. The latter extends through valve 70, pipe section 71, packer assembly 44 and pipestring 10 for a distance longer than the local depth of seabed 14. The other end of cable 82 is connected to a lug 86 on a piston assembly 88 disposed in pipestring 10. Assembly 88 comprises a barrel-shaped body 90, runner wheels 92 and an annular sealing element 94.

Figure 7:
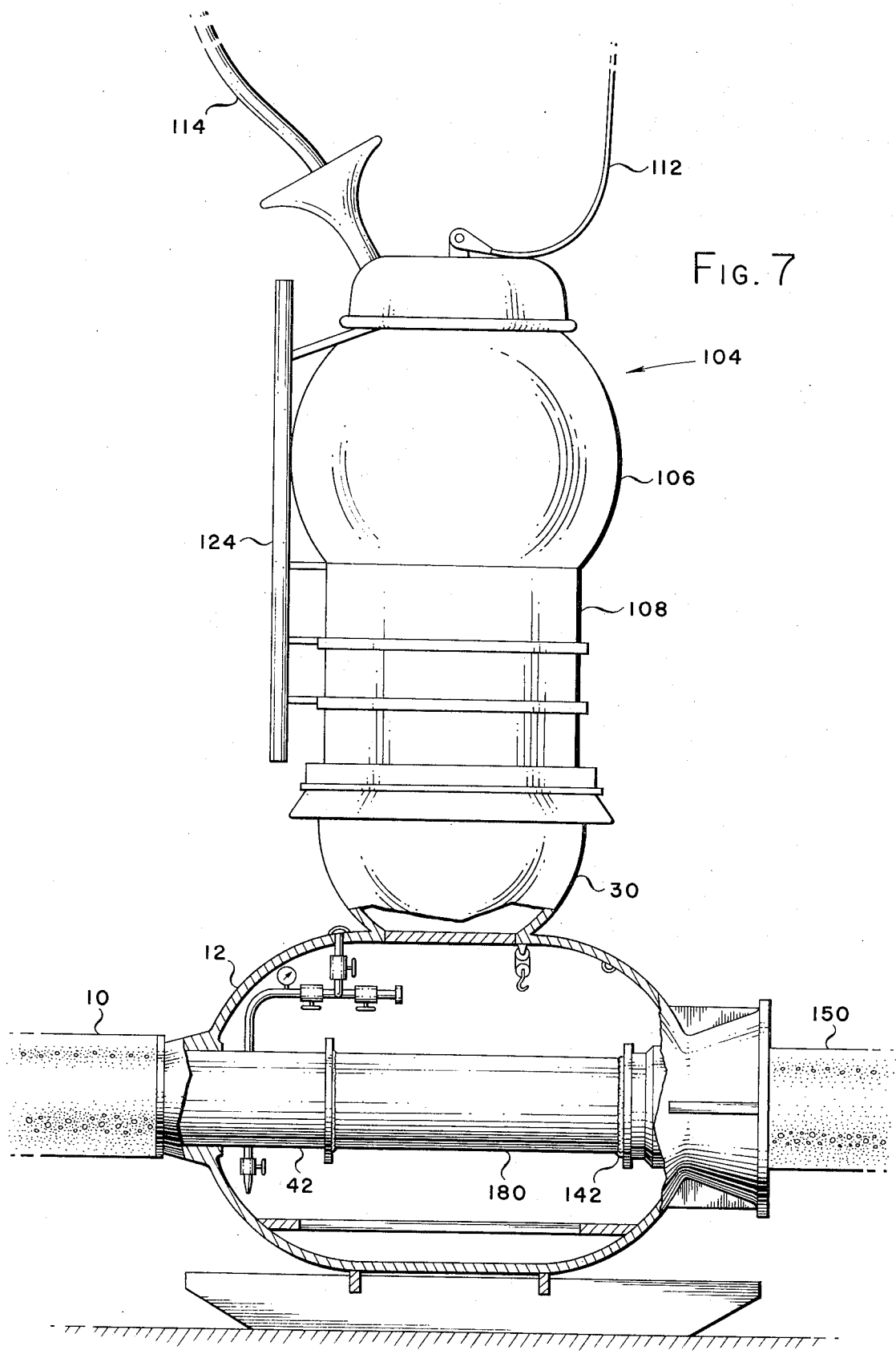
FIG. 7 is a side elevational view of the pipestring and chamber, showing the utility capsule in full and the two pipestrings joined within the chamber.

After pipestring 10 has been submerged to the seabed, a buoy 100 attached to cable 102, previously emplaced in access hatch 30, is released, as by a sonar signal, to be recovered at the surface by personnel in an utility capsule 104. As shown in FIGS. 3 and 7, the capsule 104 is a bulbous pressure vessel with a service and crew portion 106 and an open skirt portion 108. The capsule operates from a surface vessel 110, and in this embodiment, is tethered to the vessel by a cable 112. Vessel 110 supplies the capsule with air, hydraulic fluid, electrical and communication lines through an umbilical cord 114. The capsule 104 is provided with winch means (not shown) which is used to pull in cable 102 for descent from the surface to joint chamber 12. Also within the scope of the present invention is a capsule having independent propulsion means which will enable it to ascend and descend without the use of cables.

Capsule 104 mates with chamber 12 at access hatch 30 (FIGS. 4, 5 and 7). Hatch 30 has an open bowl construction with a sealing ring 120 at the top and a door 122 at the bottom, which provides access into the chamber. After mating, seawater in the hatch 30 and the open skirt portion 108 of the capsule is removed by capsule pumps 124 and atmospheric pressure is established in the enclosure formed by the skirt portion and the hatch. Workmen then descend from the service portion 106 of the capsule into the enclosure, open door 122, and descend into the joint chamber. Appropriate conduit means (not shown) are connected between the capsule and the chamber, which means supplying atmospheric pressure air as well as electrical and hydraulic power for work within the chamber.

After entry into the chamber, workmen prepare to release buoy 72 by retracting hydraulically actuated packer seal 74 and then opening a hull valve 128, controlling a hull opening 130, and a valve 132 in a pipe assembly 134. The latter assembly interconnects extension 42, pressure cap 66 and the ambient seawater (FIGS. 4 and 5). Valve 136 controlling flow to extension 42 is kept closed. Seawater flowing into pipe assembly 134 and pressure cap 66 equalizes the seawater pressure on buoy 72 and releases the sealing action of elastomeric ring 76 and bearing ring 78 on the buoy. Valve 132 is then closed, and pressure cap 66 is connected by line 138 to pump means on the capsule (not shown). The pump pressure forces buoy 72 out of the port assembly 60.

Buoy 72 rises to the surface, pulling cable 82 with it and bringing piston assembly 88 close to the chamber. If desired, a cable odometer (not shown) can be installed in conjunction with pipe section 84 which would indicate the cable footage and velocity. Workmen on the surface recover the buoy and then attach cable 82 to a lug 140 on a pull-in plug 142 attached to a second pipestring 150 at the surface. Pipestring 150 is similar to pipestring 10 in size and construction and also is attached at one end to a joint chamber 152 identical to chamber 12 (FIG. 3). Buoys 154 keep the pipestring afloat prior to joining and are released or rendered inoperative as required to facilitate joining and laying of the pipestring.

When the cable 82 is attached to pipestring 150, workmen on the surface call the workmen in the chamber via the capsule communication lines to start pulling down the pipestring. Valve 136 is then opened to admit seawater into pipestring 10. The seawater forces piston assembly 88 outwardly in pipestring 10 and in turn pulls pipestring 150 down toward the chamber. The piston velocity, which governs the pull-down rate of pipestring 150, may be regulated by throttling valve 136 and by observing pressure readings on a gauge 160 installed downstream of valve 136. The ambient seawater pressure on piston assembly 88 may also be augmented by pump means (not shown) on the capsule.

Figure 6:
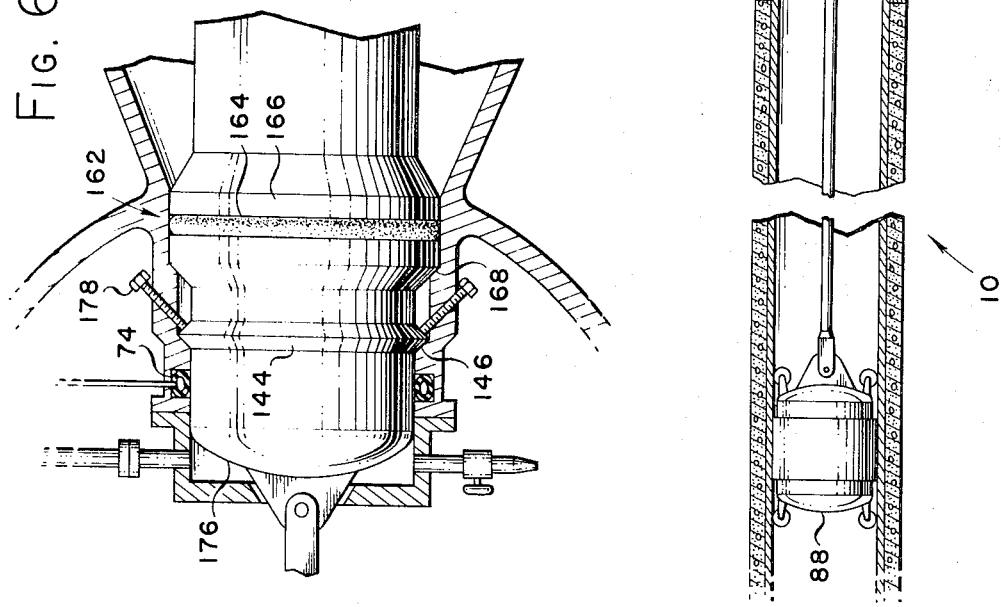
FIG. 6 is a fragmentary, enlarged, side elevational view, showing the second pipestring locked and sealed in the port.

As the pull-in plug 142 on pipestring 150 is pulled into the flared port portion 64, the entrapped seawater provides a cushioning effect to reduce the engagement velocity of pipestring 150. Then, as the plug 142 moves into the internal port portion 62, valve 136 is closed to prevent further flow of seawater into pipestring 10. As shown in FIGS. 5 and 6, plug 142 is provided with a ring 144, triangular in cross-section, which butts against a bevelled edge 146 in cylindrical portion 62 of the port assembly. Plug 142 is sealed in portion 62 by a compressible seal 162 comprising an elastomeric ring 164 and a metal bearing ring 166 which engages shoulder 168 in portion 62. Additionally, packer seal 74 is inflated around plug 142 to seal the port. Then, stud bolts 178, located circumferentially around internal port portion 62, are set against ring 144 to lock the plug 142 to the port assembly.

Pipestring 150 is then laid on the seabed by sequential removal of buoys 154, as shown in FIG. 3. Tension on the pipestring is maintained by surface vessel 22 by means of a cable 158 attached to chamber 152.

While pipestring 150 is being laid on the seabed, seawater pressure in the pipe assembly 134 and pipestring 10 is relieved through a pipeline 170. Seawater trapped in pressure cap 66 is removed through line 138 connected to pumps (not shown) on the capsule. Pressure cap 66 is disconnected from pipe assembly 134, and then cap 66 and valve 70 are slid over pipe 71 towards pipe extension 42 to expose cable 82. This is accomplished with the aid of lug 172 and block and tackle hoist means 174. Cable 82 is disconnected from lug 140 and allowed to butt against end wall 52 of packer assembly 44. Ball valve 70 and pressure cap 66 are removed from pipe section 71. In turn, pipe section 71 and blind flange 54 are removed from their attachments. An end cap 176 on plug 142 is also removed, exposing the end of plug 142 for joining. Cable 82, piston assembly 88, packer assembly 44 and the seawater contained in pipestring 10 are later flushed to the shore installation after completion of the pipeline.

A linking pipe section 180 carried in the chamber is then fitted between the exposed ends of extension 42 and plug 142 and then joining thereto either with the use of bolts or by welding (FIG. 6). The joints or welds are inspected with conventional means (not shown) to insure proper jointure.

After having completed the joining of the two pipestrings, the workmen return to the capsule, bringing with them the welding and inspection equipment. Hatch door 122 is again closed and sealed and a new buoy placed in access hatch 30 for future location of the chamber, should this be necessary. The capsule is then returned to the surface by winching in cable 112 attached to surface ship 110.

After jointure, the capsule 106 and surface ship 110 are relocated and readied for a subsequent joining operation at chamber 152 in the manner previously described.

Other variations and modifications of the present invention will be obvious to those skilled in the art and it is intended to cover in the appended claims all such modifications and equivalents as fall within the true spirit and scope of the invention.

We claim:
1. A segment for a subsea pipeline, said segment comprising:
    a first pipestring;
    a joint chamber attached to one end of said pipestring;
    said chamber comprising a pressure hull and having port means opposite the first pipestring;
    piston means disposed in said first pipestring;
    fluid means for actuating said piston means;
    cable means attached to said piston means, said cable means being adapted to pull a second pipestring into the chamber through said port means; and
    means within the chamber for joining the first and second pipestrings.

2. A segment according to claim 1, wherein said chamber is maintained at atmospheric pressure.

3. A segment according to claim 2, wherein said chamber has an access hatch means for entry by personnel.

4. A segment according to claim 3, including a buoy contained in said hatch means, said buoy being adapted to be retrieved at the sea surface when the chamber is submerged.

5. A segment according to claim 1, wherein said first pipestring protrudes within said chamber and is closed off with a packer assembly.

6. A segment according to claim 5, including pipe means in said chamber for introducing ambient sea water to the first pipestring and actuating said piston means.

7. A segment according to claim 1, wherein said port means comprises a substantially cylindrical internal portion and a flared external portion and is closed off with a pressure cap.

8. A segment according to claim 7, including a buoy partially contained in said port means, said buoy being attached to said cable means and being adapted to be retrieved at the sea surface when the chamber is submerged.

9. A segment according to claim 8, including pipe means in said chamber for introducing ambient sea water to the port means for equalizing sea water pressure on the buoy and pump means for expelling the buoy from said port means.

10. A method of connecting pipeline segments in a subsea pipeline, said method comprising:
providing a plurality of pipeline segments, each segment comprising a pipestring and a pressurized joint chamber attached at one end of said pipestring;
laying a first segment on the seabed;
utilizing a capsule to descend from the surface and to enter the submerged joint chamber;
releasing a marking buoy from the submerged joint chamber to the surface, said buoy being connected by a cable to piston means disposed in the pipestring of said first segment;
connecting the cable to a second segment on the surface;
utilizing fluid pressure to actuate said piston means and thereby pull the second segment down to the submerged joint chamber;
joining the first and second pipe strings within the chamber; and
ascending to the surface with said capsule.

11. A method of laying a subsea pipeline, said method comprising:
providing a plurality of pipeline segments at the sea surface, each segment comprising a pipestring and a pressurized joint chamber attached at one end of said pipestring;
attaching the initial segment at the free end to a shore installation;
laying said initial segment on the seabed by progressively removing a series of buoys attached to the pipestring;
utilizing a capsule to descend from the surface to the submerged chamber of the initial segment;
releasing a buoy from said chamber to the surface, said buoy being connected by a cable to piston means disposed in the submerged pipestring;
connecting the cable to a second pipeline segment on the surface;
utilizing ambient sea water pressure to actuate said piston means and thereby pull the second segment down to the joint chamber;
laying the second segment on the seabed by progressively removing a series of buoys attached to the pipestring;
joining the first and second pipestrings within the chamber; and
ascending to the surface with said capsule.

* * * * *